United States Patent
Amos et al.

(10) Patent No.: US 11,875,252 B2
(45) Date of Patent: Jan. 16, 2024

(54) NEURAL NETWORK INCLUDING A NEURAL NETWORK PROJECTION LAYER CONFIGURED FOR A SUMMING PARAMETER

(71) Applicants: Robert Bosch GmbH, Stuttgart (DE); Intel Corporation, Santa Clara, CA (US); Carnegie Mellon University (CMU), Pittsburgh, PA (US)

(72) Inventors: Brandon David Amos, Roanoke, VA (US); Vladlen Koltun, Santa Clara, CA (US); Jeremy Zieg Kolter, Pittsburgh, PA (US); Frank Rüdiger Schmidt, Stuttgart (DE)

( * ) Notice: Subject to any disclaimer, the term of this patent is extended or adjusted under 35 U.S.C. 154(b) by 549 days.

(21) Appl. No.: 16/415,500

(22) Filed: May 17, 2019

(65) Prior Publication Data
US 2020/0364553 A1 Nov. 19, 2020

(51) Int. Cl.
*G06N 3/08* (2023.01)
*G06N 3/04* (2023.01)

(52) U.S. Cl.
CPC ............... *G06N 3/08* (2013.01); *G06N 3/04* (2013.01)

(58) Field of Classification Search
CPC .................................. G06N 3/08; G06N 3/04
See application file for complete search history.

(56) References Cited

U.S. PATENT DOCUMENTS

| | | | |
|---|---|---|---|
| 5,367,702 A * | 11/1994 | Mahant-Shetti | G06F 7/552 708/606 |
| 2012/0030020 A1* | 2/2012 | Bucak | G06Q 30/0255 705/14.53 |
| 2019/0050372 A1* | 2/2019 | Zeng | G06F 17/17 |
| 2019/0147220 A1 | 5/2019 | McCormac et al. | |
| 2019/0163982 A1* | 5/2019 | Block | G06N 5/022 |
| 2020/0302016 A1* | 9/2020 | Aggarwal | G06F 40/30 |

OTHER PUBLICATIONS

Mikolov, Tomas, et al. "Efficient estimation of word representations in vector space." arXiv preprint arXiv:1301.3781 (Year: 2013).*
Beheshti, Mohsen, et al. "On interval weighted three-layer neural networks." Proceedings 31st Annual Simulation Symposium. IEEE, 1998. (Year: 1998).*
Chen, Steven, et al. "Approximating explicit model predictive control using constrained neural networks." 2018 Annual American control conference (ACC). IEEE, 2018. (Year: 2018).*
Zhong, Guoqiang, et al. "Deep hashing learning networks." 2016 International Joint Conference on Neural Networks (IJCNN). IEEE, 2016. (Year: 2016).*

(Continued)

*Primary Examiner* — Miranda M Huang
*Assistant Examiner* — Sidney Vincent Bostwick

(57) ABSTRACT

Some embodiments are directed to a neural network training device for training a neural network. At least one layer of the neural network layers is a projection layer. The projection layer projects a layer input vector (x) of the projection layer to a layer output vector (y). The output vector (y) sums to the summing parameter (k).

17 Claims, 10 Drawing Sheets

(56) References Cited

OTHER PUBLICATIONS

Duch, Włodzisław. "Visualization of hidden node activity in neural networks: I. visualization methods." Artificial Intelligence and Soft Computing—ICAISC 2004: 7th International Conference, Zakopane, Poland, Jun. 7-11, 2004. Proceedings 7. Springer Berlin Heidelberg, 2004. (Year: 2004).*
Zeming Li, et al., "Light-Head R-CNN: In Defense of Two-Stage Object Detector," Published in ArXiv:1711.07264v2 [cs.CV] Nov. 23, 2017.
Gao Huang, et al., "Densely Connected Convolutional Networks," Published in ArXiv:1608.06993v5 [cs.CV] Jan. 28, 2018.
Leonard Berrada, et al., "Smooth Loss Functions for Deep Top-K Classification," Published in ArXiv:1802.07595v1 [cs.LG] Feb. 21, 2018.
Brandon Amos, et al. "Differentiable Optimization-Based Modeling for Machine Learning," PhD thesis, CMU-CS-19-109, Carnegie Mellon University, Pittsburgh, PA, May 2019.
Brandon Amos, et al., "OptNet: Differentiable Optimization as a Layer in Neural Networks," Proceedings of the 34th International Conference on Machine Learning, Sydney, Australia, PMLR 70, 2017.
Rowan Zellers, et al., "Neural Motifs: Scene Graph Parsing with Global Context," Published in ArXiv:1711.06640v2 [cs.CV] Mar. 29, 2018.
Brandon Amos, et al., "The Limited Multi-Label Projection Layer," arXiv: 1906.08707v1 [cs.LG] Jun. 20, 2019, pp. 1-15.

\* cited by examiner

NEURAL NETWORK INCLUDING A NEURAL NETWORK PROJECTION LAYER CONFIGURED FOR A SUMMING PARAMETER

FIELD

The presently disclosed subject matter relates to a neural network training device for training a neural network, a neural network applying device for applying a trained neural network, an autonomous device controller including a neural network device, a neural network training method for training a neural network, a neural network method for applying a trained neural network, a transitory or non-transitory computer readable medium.

BACKGROUND

For some classification tasks it is desired that a given input, say an image, is classified into multiple labels. Multi-label classification can arise from a task being truly multi-label, e.g., as in image classification or graph generation tasks. For example, it may be the case that multiple labels are appropriate for an image, e.g., in object classification it may happen that an image shows multiple objects so that the image may be classified with multiple labels that describe the multiple objects.

Multi-label classification may also arise when a single-label prediction task is turned into a multi-label prediction task that predicts a set of top-k labels. For example, a top-k labeling may be desired, e.g., to determine the top-k error. The top-k error is a common measure of performance in machine learning and computer vision.

For top-k classification one may require a neural network to predict the k most likely labels, where k is typically very small compared to the total number of labels. Then the prediction is considered incorrect if all or most of its k labels differ from the ground truth, and correct otherwise. This is commonly referred to as the top-k error. Typically, the classifier includes a deep neural network. The deep neural network may be trained for top-k classification with the cross-entropy loss. A typical example value of k equals 5, larger and smaller values are also possible.

A known top-k classifier is described in "Smooth Loss Functions for Deep Top-k Classification" by Leonard Berrada, et al., and included herein by reference and referred to as 'Smooth SVM' or as 'Berrada', In this paper disadvantages of training with the cross-entropy loss are mentioned; for example, cross-entropy is not tailored for any particular k, in particular not for top-5 error minimization. Furthermore, in cases where a limited amount of data is available, learning large neural networks with cross-entropy can be prone to over-fitting on incomplete or noisy labels.

The known top-k classifier described in Berrada addresses these problems by training a deep neural network with a loss-function that takes into account that output of the neural network is evaluated according to the top-k error. However, disadvantages remain. Furthermore, the training performance of the smooth SVM can be improved. Moreover, smooth SVM can be slow and moreover computation time increases with k.

SUMMARY

It would be advantageous to have an improved neural network. The presently disclosed subject matter is defined by the independent claims; the dependent claims define advantageous embodiments.

An embodiment of a neural network includes a sequence of neural network layers. At least one layer of the sequence of neural network layers is a projection layer. The projection layer is configured to project a layer input vector of the projection layer to a layer output vector. The projection includes an optimization of a layer loss-function applied to the layer output vector. The optimization is subject to the condition that the projection layer output vector sums to a summing parameter.

Typically, a neural network layer applies a function that maps a neural network layer input vector to a neural network layer output vector. Interestingly, obtaining the output vector of the projection layer, for a given input vector includes solving an optimization problem.

The loss function may comprise at least part parts: a regulating term and a projection term.

These two terms may be used to control the projection. For example, the regulating term may be used to steer the optimization away from undesirable vectors, e.g., sparse vectors, while the projection term may be used to ensure that the projection layer output vector has a defined relation with the input, e.g., resembles the input vector.

There are many optimization algorithms that may be used for solving the optimization in the projection layer, ranging from hill climbing to simulated annealing. However, particularly efficient algorithms for applying this type of layer have been developed and are described herein.

For example, the projection layer may be the final layer of the sequence of neural network layers. The earlier layers may be conventional neural network layers, e.g., convolutional layers, ReLu layers, dense layers, softmax layers, pooling layers, etc. For example, the projection layer may be added to a classification network. For example, the classification network may be configured to produce in its final layer a vector that indicates a likelihood for multiple object classifications. By adding the projection layer, the known network may be optimized for multiple classifications or for top-k predictions.

It is possible to modify a known classification network for top-k predication. For example, one may simply take the k highest predictions as the top-k predication. This is not optimal though since the network may never receive any feedback that it is evaluated for its top-k predictions.

The projection layer may in particular be applied in situations in which multiple labels are to be predicted but the training data is known to be incomplete. For example, some labels are available for sensor data, e.g., for images, but not all or even most applicable labels are listed. A situation in which this phenomenon is particularly pronounced is in prediction relationships for the edges in scene graph prediction task. Typically, training sensor data is not annotated with all or even most possible applicable labels.

The optimization layer may in particular be applied in situations in a neural network for use in an autonomous device controller. In this case, the neural network may be used to classify objects in the vicinity of the autonomous device. Using a projection layer increases the robustness of the classification.

For example, the controller may use the neural network to classify objects in the sensor data, and to generate a control signal for controlling the autonomous device using the classification. The controller may be a part of the autonomous device. The autonomous device may include sensors configured to generate sensor data which may be used for the input of the neural network.

A neural network training device and a neural network application device are electronic devices. The neural network application device may be comprised in another physical device, e.g., a technical system, for controlling the physical device, e.g., its movement.

An aspect of the presently disclosed subject matter is a neural network training method for training a neural network. An aspect of the presently disclosed subject matter is a neural network method for applying a trained neural network.

An embodiment of the methods may be implemented on a computer as a computer implemented method, or in dedicated hardware, or in a combination of both. Executable code for an embodiment of the method may be stored on a computer program product. Examples of computer program products include memory devices, optical storage devices, integrated circuits, servers, online software, etc. Preferably, the computer program product may include non-transitory program code stored on a computer readable medium for performing an embodiment of the method when the program product is executed on a computer.

In an embodiment, the computer program includes computer program code adapted to perform all or part of the steps of an embodiment of the method when the computer program is run on a computer. Preferably, the computer program may be embodied on a computer readable medium.

Another aspect of the presently disclosed subject matter provides a method of making the computer program available for downloading. This aspect is used when the computer program is uploaded into, e.g., Apple's App Store, Google's Play Store, or Microsoft's Windows Store, and when the computer program is available for downloading from such a store.

BRIEF DESCRIPTION OF THE DRAWINGS

Further details, aspects, and embodiments of the presently disclosed subject matter will be described, by way of example, with reference to the drawings. Elements in the figures are illustrated for simplicity and clarity and have not necessarily been drawn to scale. In the figures, elements which correspond to elements already described may have the same reference numerals. In the drawings, FIG. 1a schematically shows an example of an embodiment of a neural network training device for training a trained neural network, FIG. 1b schematically shows an example of an embodiment of a neural network applying device for applying a trained neural network, FIG. 1c schematically shows an example of an embodiment of a LML polytope, FIG. 2a schematically shows an example of an embodiment of optimizing a dual variable, FIG. 2b schematically shows an example of a decomposition of the individual logistic functions that contribute to a function g(v), FIG. 3a schematically shows timing performance results for forward time in an example of an embodiment, FIG. 3b schematically shows timing performance results for backward time in an example of an embodiment, FIG. 3c schematically shows an example of training recall for an embodiment of scene graph generation on the visual genome, FIG. 4 schematically shows an example of an embodiment of a neural network method for training a neural network, FIG. 5 schematically shows an example of an embodiment of a neural network method for applying a trained neural network, FIG. 6a schematically shows a computer readable medium having a writable part including a computer program according to an embodiment, FIG. 6b schematically shows a representation of a processor system according to an embodiment.

DETAILED DESCRIPTION OF EMBODIMENTS

Figure 1A:
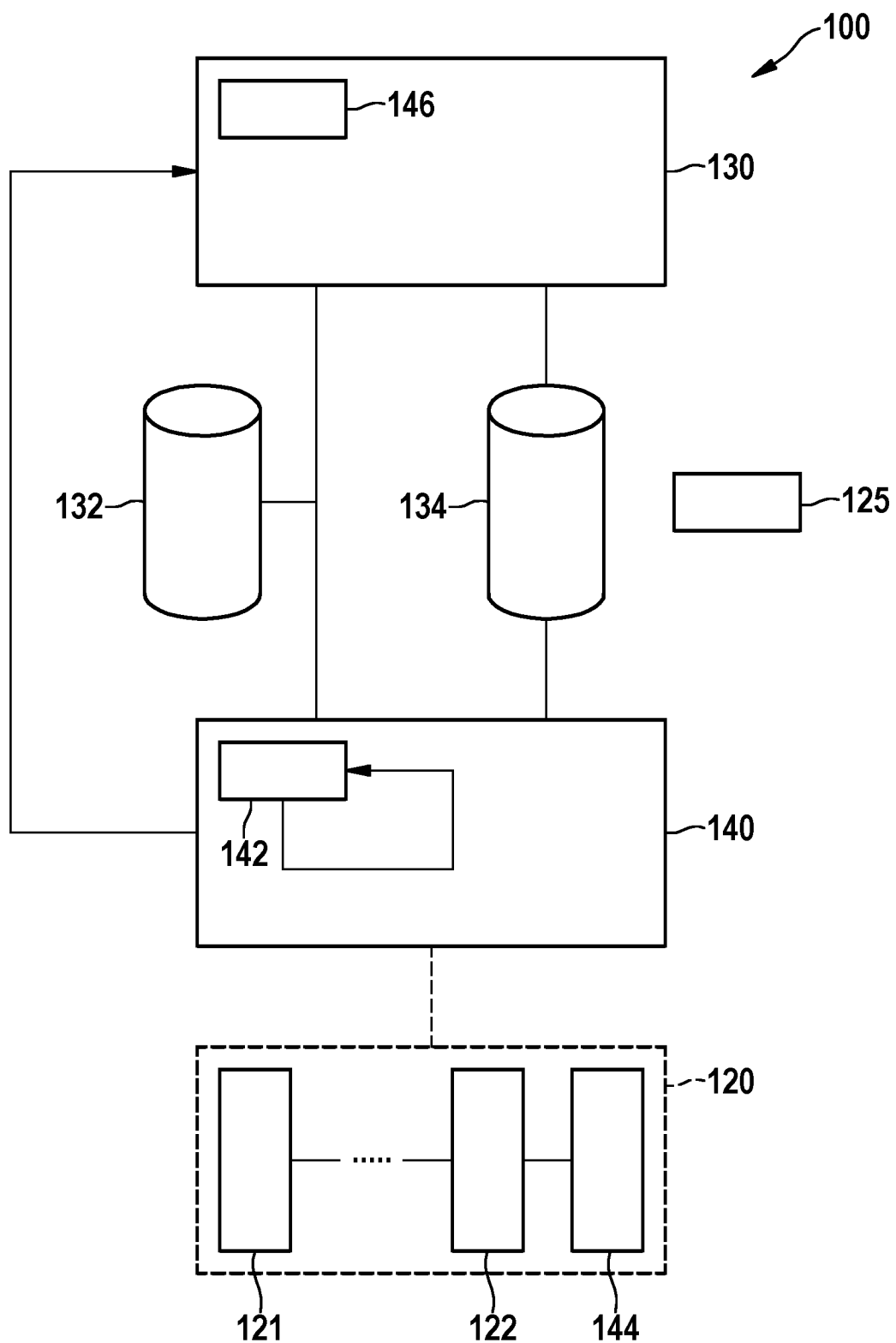

While this presently disclosed subject matter is susceptible of embodiment in many different forms, there are shown in the drawings and will herein be described in detail one or more specific embodiments, with the understanding that the present disclosure is to be considered as exemplary of the principles of the presently disclosed subject matter and not intended to limit the presently disclosed subject matter to the specific embodiments shown and described.

In the following, for the sake of understanding, elements of embodiments are described in operation. However, it will be apparent that the respective elements are arranged to perform the functions being described as performed by them.

Further, the presently disclosed subject matter is not limited to the embodiments, and the presently disclosed subject matter lies in each and every novel feature or combination of features described herein or recited in mutually different dependent claims.

Multi-label prediction tasks show up frequently in computer vision. Multi-label predictions can arise from a task being truly multi-label, e.g., as in graph generation tasks, or by turning a single-label prediction task into a multi-label prediction task that predicts a set of top-k labels, for example. In high-dimensional cases, such as scene graph generation, annotating multi-label data is difficult and often results in datasets that have an incomplete labeling. In these cases, neural networks are typically limited to predicting k labels and are evaluated on the recall, the proportion of known labels that are present in the network's predicted set. Standard approaches, such as, using a softmax or sigmoid functions are not ideal here as they have no way of allowing the neural network to capture labels that are unobserved.

Autonomous device control, e.g., for autonomous cars, depends on decision making based on reliable classification. In practical classification problems, the amount of classes is usually very large. This leads to classifiers that are brittle. The resulting control of devices is therefore unreliable which is especially undesirable for autonomous device control.

To increase the robustness of device control, the number of labels may be fixed to a predefined number k. This increases robustness of the classifier for device control. A neural network that predicts a predefined number of labels benefits from a projection layer as in an embodiment.

For example, in an embodiment a neural network may be unable to classify K classes exactly, but the classification of top(k) classes for k<<K is easier to perform using a projection layer according to an embodiment. In any case, some data points contain more than 1 class and a multi-label class makes more sense. To understand a scene, e.g., when performing scene graph generation, etc., object(s) may be classified in relation to a pre-defined number of other objects.

A new projection layer is provided which may be used as a new primitive operation in a neural network, e.g., for end-to-end learning systems. The projection layer is referred to herein as the Limited Multi-Label (LML) layer. The LML layer provides a probabilistic way of modeling multi-label predictions limited to having exactly k labels.

FIG. 1a schematically shows an example of an embodiment of a neural network training device 100 for training a neural network. The neural network includes a sequence of neural network layers 120. Neural network layers are configured to project a layer input vector to a layer output vector. The layers have connections between them. For example, neural network training device 100 may comprise a neural network storage 134 configured to store parameters for multiple layers of the sequence of neural network layers. For example, the parameters may be parameters of neurons of the layers, or weights of connections within or between layers 120. The network is also schematically shown in dashed lines as sequence 120. FIG. 1a shows layers 121 and 122 of the sequence of neural network layers 120.

The network may be configured for a forward pass and a backward pass. For example, device 100 may comprise an application unit 140 configured for executing the forward pass, e.g., to apply the neural network to a given input. For example, unit 140 may be configured to apply the sequence of neural network layers to input data. Application unit 140 may comprise a projection layer unit 142 which is further described below.

Training device 100 may comprise a training storage 132 configured to store training data for training the neural network 120. For example, application unit 140 may be applied on training data in training data storage 132.

Training device 100 further includes a backpropagation unit 130 configured to adjust the stored parameters to train the network, e.g., to adjust the parameters so-that outputs of the network for a training input more closely follows a training output. Backpropagation unit 130 may comprise a backpropagation unit for a projection layer 146.

Figure 1B:
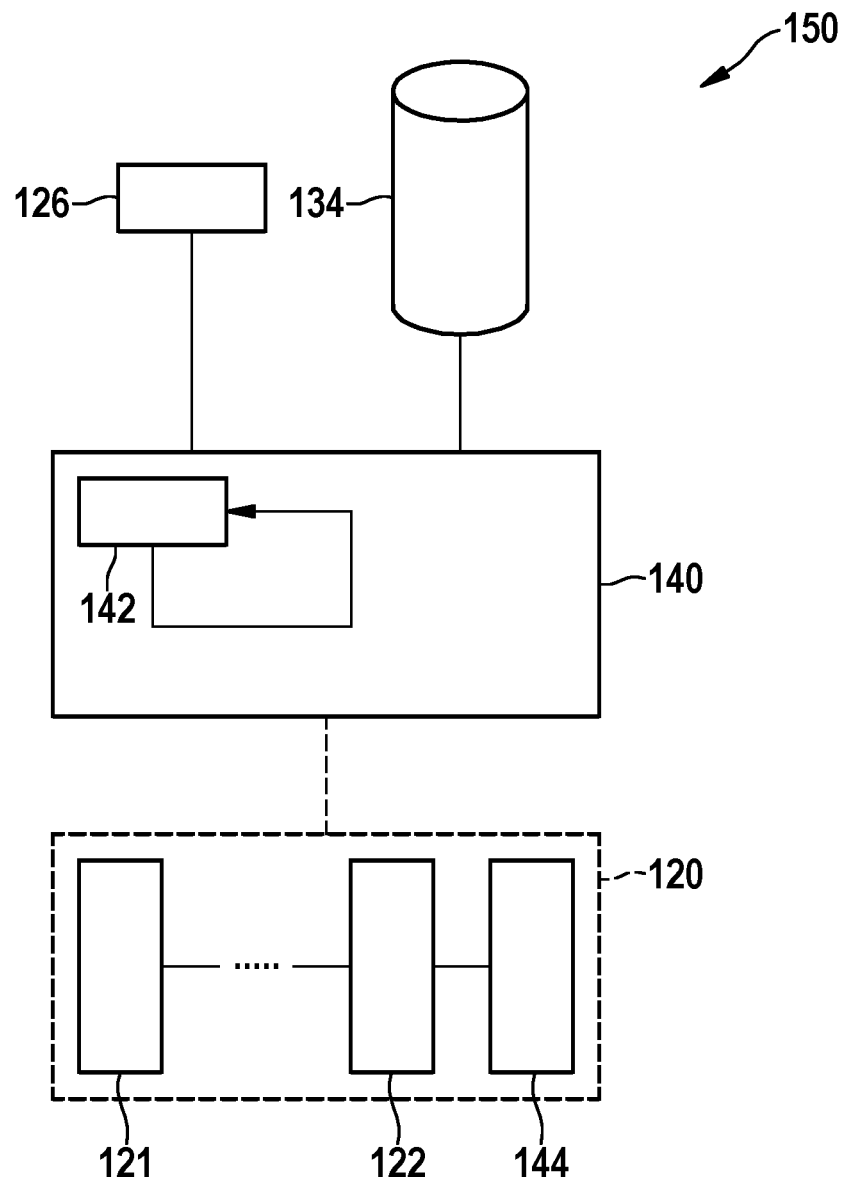

Once the network is trained, it may be used in whole or in part in an applying device for applying a trained neural network. FIG. 1b schematically shows an example of an embodiment of a neural network applying device 150 for applying a trained neural network. Network applying device 150 includes a communication interface 126 for receiving input data. The application unit 140 and projection layer unit 142 may be the same as in FIG. 1a.

For example, the training data in FIG. 1a and inputs in FIG. 1b may comprise sensor data annotated with one or more labels. The neural network may be trained to generate a number of labels given the sensor data in accordance with the training data. The number of labels may be predetermined. For example, the final output of the neural network may be a vector with entries between 0 and 1, each entry corresponding to a label, and the value indicating a likelihood that an object with the corresponding label was recognized in the input. For example, a first entry of the output vector may correspond to a car, a second to a cyclist, and so on. Interestingly, the number of predicted labels may be predetermined. For example, it may be constrained to predict a 5 labels or more or fewer, or exactly 1, or 10 or more, or 100 or more, etc.

The training data may comprise any sensor data including one or more of: video, radar, LiDAR, ultrasonic, motion, etc. The LML layer may be used in feed-forward networks like CNN (frame- or video-based) as well as in RNN architectures (frame- or video-based). The resulting neural network can be used to compute a control signal for controlling a physical system. For example, the control signal may be for a computer-controlled machine, like a robot, a vehicle, a domestic appliance, a power tool, a manufacturing machine, a personal assistant or an access control system, etc. For example, the decision may be made based on a classification result. The LML projection layer helps to perform the classification in a more robust way.

A neural network trained for classification including an LML projection layer may be comprised in a system for conveying information, such as a surveillance system or an imaging system, e.g., a medical imaging system. For example, the neural network may be configured for classifying the sensor data, e.g., to grant access to a system, e.g., by face recognition. Interestingly, the neural network allows for ambiguities in the observed data due to the robust classification. For example, it was found that the neural network may be trained on incomplete classification training data, while the output of the neural network nevertheless approaches a ground truth.

Systems 100 and/or 150 may communicate with each other or with external storage or input devices or output devices over a computer network. The computer network may be an internet, an intranet, a LAN, a WLAN, etc. The computer network may be the Internet. The systems comprise a connection interface which is arranged to communicate within the system or outside of the system as needed. For example, the connection interface may comprise a connector, e.g., a wired connector, e.g., an Ethernet connector, an optical connector, etc., or a wireless connector, e.g., an antenna, e.g., a Wi-Fi, 4G or 5G antenna, etc.

The execution of system 100 and 150 is implemented in a processor system, e.g., one or more processor circuits, examples of which are shown herein. FIGS. 1a and 1b show functional units that may be functional units of the processor system. For example, FIGS. 1a and 1b may be used as a blueprint of a possible functional organization of the processor system. The processor circuit(s) are not shown separate from the units in these figures For example, the functional units shown in FIGS. 1a and 1b may be wholly or partially implemented in computer instructions that are stored at system 100 and 150, e.g., in an electronic memory of system 100 and 150, and are executable by a microprocessor of system 100 and 150. In hybrid embodiments, functional units are implemented partially in hardware, e.g., as coprocessors, e.g., neural network coprocessors, and partially in software stored and executed on system 100 and 150. Parameters of the network and/or training data may be stored locally at system 100 and 150 or may be stored in cloud storage.

The projection layer is shown in FIGS. 1a and 1b as layer 144. Application layer 144 includes a projection layer 142 configured to apply the projection layer. In FIGS. 1a and 1b, a single projection layer is shown, in this case as the last layer. This may however not be required, both the forward and backward pass can be applied to multiple projection layers and/or to a projection layer that is not the final layer. For example, the output of a projection layer, e.g., a signal identifying objects in an input sensor data may be used as an input to further network layers that further process the data.

The projection may not comprise trainable parameters. In particular the number of predicted labels k may be fixed. However, in an embodiment, some parameters including the number k, but possibly parameters of the loss function, such as a temperature or parameters of a regulator or projection terms may trained in a meta-training pass. During an optional meta-training pass, the training device is configured to select and/or modify the hyper parameters in accordance with the performance goal, e.g., recall.

The projection layer, e.g., projection layer 144, may be configured for a summing parameter k. The summing parameter indicates for how many labels the network is trained. For example, to train a network to predict 5 labels, a summing parameter of 5 may be used. The summing parameter is typically a positive integer, e.g., 1, 2, or more, e.g., 5 or more, etc. The summing parameter indicates on the one hand the type of projection that is performed. Nevertheless, the system may be trained and applied for non-integer, but positive, k as well, as for the projection the summing parameter does not need to be an integer. Nevertheless, it assumed that the summing parameter is a positive integer.

In an embodiment, the training data includes sensor data annotated with one or more labels. The neural network may be trained to generate a number of labels given sensor data in accordance with the training data as input, wherein the number of labels equals the summing parameter k. Note that during training, or even when training is completed, the output of the neural network, e.g., the output of projection layer 144, may contain more than k non-zero entries; in fact this is likely. However, the sum of the entries equal k, or at least is close to it. For example, it may be within some threshold. To select a list of k-labels, the k largest entries may be selected.

The projection layer, e.g., layer 144, e.g., as implemented in projection layer unit 142, may be configured to project a layer input vector x of the projection layer to a layer output vector y. The projecting including optimizing a layer loss-function applied to the layer output vector subject to the condition that the projection layer output vector y sums to the summing parameter k. Typically, the entries in the projection layer output vector y are also subject to the condition that they are numbers between 0 and 1.

For example, if the ground-truth were to encode a number of k labels, these may be encoded as a 0-1 vector having k 1s for the labels, and (n−k) 0s for the non-chosen labels (this assumes a total of n possible labels). For example, the summing parameter may also be used to define that a top-k output is desired, even though the training data might encode fewer than k labels, or may even encode just 1 label. Thus the projection layer is particularly suited to predict multiple labels in the presence of incomplete training data.

The layer loss-function may comprise, a regulating term and a projection term. The projection term pushes the projection to an output y that resembles the input, e.g., is in the same direction as the input. For example, the projection term may be $-\langle x, y \rangle$. The regulating term may be used to push the output away from sparse vectors. For example, the regulating term may comprise the binary entropy, e.g., $-H_b(y)$. There may be a hyper parameter that balances the projection and regulating terms against each other.

To compute the projection layer 144 it does not suffice to simply compute a mathematical function that maps the input vector to an output vector. Rather, the projection layer 144 is in itself an optimization problem. For example, even for a trained network, applying the projection layer may require the computation of an optimization problem. This optimization may be done with an iterated algorithm. In FIG. 1a this is indicated in unit 142 with an arrow that points back to unit 142. Very efficient optimization algorithms have been developed to perform this particular optimization. Using such efficient algorithms the projection layer is of similar efficiency as other types of network layers.

For example, in an embodiment, a network may be designed for K classes, e.g., labels. For example, the output of network may be a vector with K entries that indicate the likelihood the corresponding class applies to the sensor data input. However, the loss function of the projection layer causes the network to be interested in the top(k) performance. For example, example, the neural network, e.g., sequence of layers 120-121 without a final projection layer, may be a known classification network. For example, the known classification network may produce a vector of length K, e.g., of so-called logits. The final layer 144 may project the logits onto the LML polytope for k. During training or testing, a network loss function may be applied to the output of layer 144, and may measure the distance between k labels, e.g., as provided by the layer 144 and the one, or more labels provided by the annotated data.

The summing parameter k may be selected by making an educated guess about the maximal number of classes k, e.g., number of objects, labels, etc., that are likely to be depicted in an image. In contrast to known systems, it may not be necessary to hand-craft a loss function for embodiments of the projections layers, yet the top-k knowledge is inserted into the training of the network. The projection layer forces the network to make k predictions, which in turn creates a training signal that optimizes the selection of k predictions.

Figure 1C:
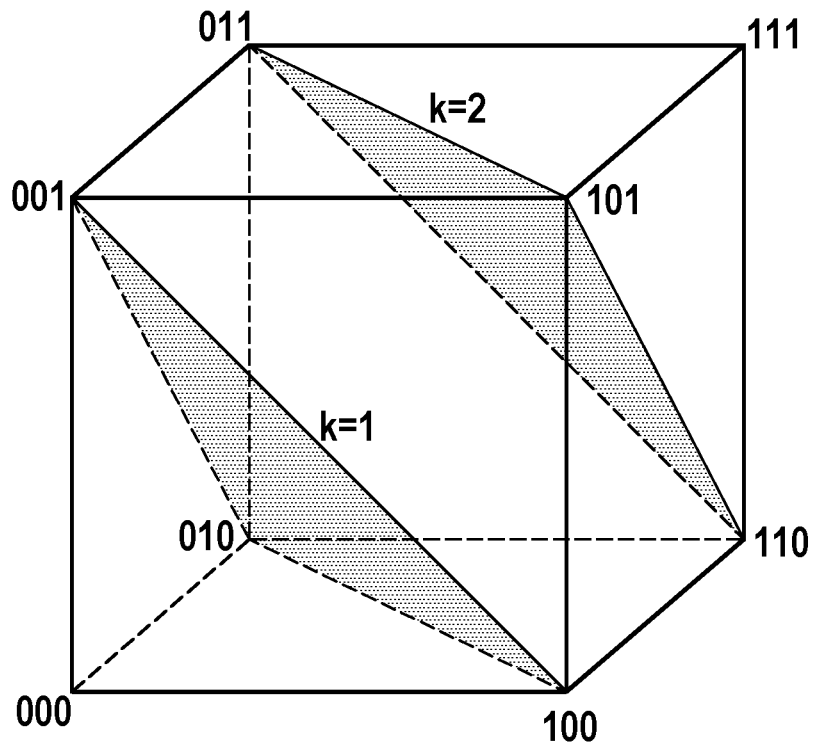
Figure 1C:
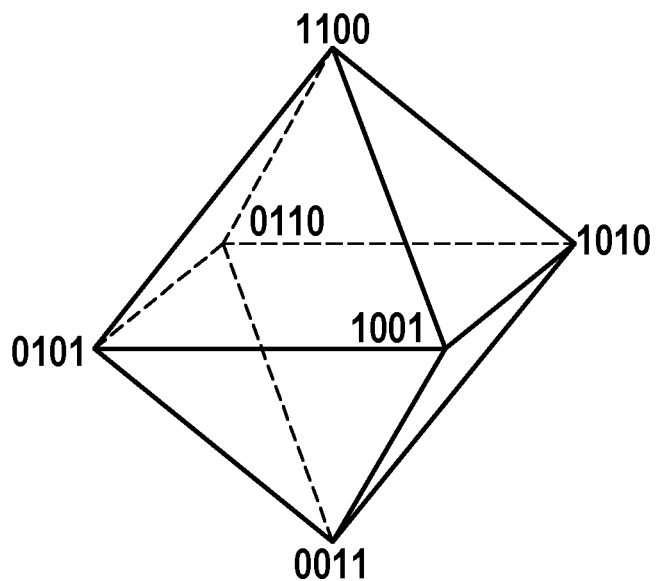

FIG. 1c schematically shows an example of an embodiment of a LML polytope. FIG. 1c shows the LML polytope $\mathcal{L}_{n,k}$ which is the set of points in the unit n-hypercube with coordinates that sum to k. $\mathcal{L}_{n,1}$ is the (n−1)-simplex. The $\mathcal{L}_{3,1}$ and $\mathcal{L}_{3,2}$ polytopes (triangles) are on the left. The $\mathcal{L}_{4,2}$ polytope (an octahedron) is on the right.

The regulating term in the layer loss function may be a sum of a function applied to the coefficients of the output vector y. Such a function may preferably be convex, continuous and has a minimum for an input between 0 and 1, e.g., at ½. These conditions ensure that the solution of the optimization problem defined by the projection layer is steered away from sparse solutions. For example, the function may be minus the binary entropy function $-H_b(y)$, or a scaled version.

The projection term in the layer loss function may be linear and minimal, over vectors of unit length, for a vector in the same direction as the layer input vector. These conditions ensure that the output of the projection layer resembles the input, except that it is optimized subject to some conditions, e.g., subject to summing to the summing parameter k, etc. For example, the projection term may be minus the dot-product $-\langle x, y \rangle$ of the layer input vector and the layer output vector, or a scaled version.

Using different functions than binary entropy and/or the dot-product still define a projection into the LML polytope, e.g., as shown in FIG. 1c.

The optimization may be performed using any suitable vector optimization algorithm, e.g., Newtonian descent, simulated annealing, and the like. A particular efficient optimization method which is also amenable to parallelization is presented herein.

The Limited Multi-Label projection layer thus provides a way of projecting onto the set of points in the unit n-hypercube with coordinates that sum to exactly k. This space can be represented as a polytope, which may be defined as the (n,k)-Limited Multi-Label polytope $$\mathcal{L}_{n,k} = \{p \in \mathbb{R}^n | 0 \le p \le 1 \text{ and } 1^T p = k\}.$$

When k=1, the LML polytope is the (n−1)-simplex. In an embodiment, k≥1. In an embodiment, k>1. Notationally, if n is implied by the context, it may be left out and one may write $\mathcal{L}_k$. FIG. 1c shows three low-dimensional examples of this polytope.

Projections onto the interior of the LML polytope may be defined as $$\Pi_{\mathcal{L}_k}(x) = \operatorname{argmin}_{0 < y < 1} -x^T y - H_b(y) \text{ s.t. } 1^T y = k \qquad (4)$$

where $H_b(y)=-\Sigma_i y_i \log y_i+(1-y_i)\log(1-y_i)$ is the binary entropy function. The function $\Pi_{L_k}(x)$ may also be written as $\pi_k(x)$.

The entropy-based regularizer in the objective helps prevent sparsity in the gradients of this projection, this helps learning. Other projections could be done by changing the regularizer or by scaling the entropy term with a temperature parameter. It can be shown mathematically that the LML projection for a vector x, such as the output of neural network, e.g., layers 120-121 that the projection $\Pi_{L_k}(x)$ preserves the magnitude-based order of the coordinates of x. The layer may be regarded a soft-projection into the interior of $L_k$.

It can be shown that finding the minimizing vector y* in order to compute $\pi_k(x)$ for an input x is equivalent to the following problem: compute $y_i^*=\sigma(x_i+v^*)$ where $g(v^*)=k$ and $g(t):=\Sigma_{i=1}^n \sigma(x_i+t)$; or in an equivalent alternative where $g(v^*)=0$ but $g(t):=-k+\Sigma_{i=1}^n(x_i+t)$. The function may be chosen as the logistic sigmoid function $$\sigma(t) := \frac{1}{1+e^{-t}}.$$

For example, in an embodiment, optimizing the layer loss function includes optimizing a scalar v*, wherein the layer output vector is computed by applying a function to the layer input vector and the optimized scalar $y_i=\sigma(x_i+v^*)$.

In an embodiment, optimizing the layer loss function includes optimizing a scalar v*, wherein the layer output vector is computed by applying a function to the layer input vector and the optimized scalar. For example, the function may be a sigmoid function which may be applied to translation of the input vector, e.g., translated by adding the optimized scalar to each entry. The sigmoid function maps the output to a value between 0 and 1, while the optimized scalar can be used to impose limitations, e.g., the limitation that the sum of the output vector is the summing parameter k.

When the loss function is selected as above, it turns out that optimizing the loss function is equivalent to optimizing the scalar taking as the function the logistic sigmoid function. Other functions, in particular sigmoid functions may be used though.

To find the optimal $v^* \in R$ one can perform a scalar optimization method. The bisection method is amenable to parallelization. For example, a bracketing method may be used to find $g(v)=0$ (using the equivalent variant definition).

Input: $x \in \mathbb{R}^n$

Parameters: d: the number of per-iteration samples and $\Delta$: the saturation offset

---

1. Initialize $v_\ell = -\pi(x)_k - \Delta$ and $v_u = -\pi(x)_{k+1} + \Delta$
2. while $|v_\ell - v_u| > \epsilon$ do
3.    Sample $v_{1:d}$ linearly from the interval $[v_\ell, v_u]$
4.    $g_{1:d} = (g(v_i))_{i=1}^d$ Ideally parallelized
5.    ▷ Return the corresponding $v_i$ early if any $g_i = 0$
6.    $i_\ell = \max\{i | g_i < 0\}$ and $i_u = i_\ell + 1$
7.    $v_\ell = v_{i_\ell}$ and $v_u = v_{i_u}$
8. end while
9. return $(v_\ell + v_u)/2$

---

The above algorithm may be varied in many ways. For example, the sampling in step 3 need not be linear, e.g., it may be random. Step 5 may be omitted. Step 9 may return $v_\ell$ or $v_u$ instead of their average, etc.

Although $g(v)=0$ is a scalar-valued root-finding problem of a differentiable, continuous, non-convex function that is monotonically increasing, it is advantageous for solving $g(v)=0$ with a bracketing method such as above that maintains an interval of lower and upper bounds around the solution v* since it is amenable to parallelization. A Newton method may advantageously use the derivative information but is not as amenable to parallelization. In an embodiment, the optimization method generalizes the bisection bracketing method by sampling g(v) for d values of v per iteration instead of a single point. For example, in an embodiment, the sample size may be d=100 points in parallel for each iteration, e.g., on a GPU. The latter usually reaches machine epsilon in less than 10 iterations. On a CPU a lower sample size may be used, e.g., d=10 points.

The initial lower bound $v_\ell$ and upper bound $v_u$ on the root can be chosen sufficiently low and/or or high so that $\sigma(x_j+v)$ is likely 0 or 1 or nearly so. In an embodiment, the upper and/or lower bounds for the scalar v are obtained by sorting the layer input vector x, selecting a component and adding and/or subtracting a value. For example, the selected component may have an index equal to the number of labels k, or the number of labels k plus one counting from the largest element, For example, an improvement can be obtained choosing for the initial lower bound $v_\ell$ and upper bound $v_u$ on the root by observing that g(v) takes a sum of logistic functions that are offset by the entries of $x \in \mathbb{R}^n$ as $\sigma(x_j+v)$. With high probability, one can use the saturated areas of the logistic functions to construct the initial bounds.

Let $\pi(x)$ sort $x \in \mathbb{R}^n$ in descending order so that $$\pi(x)_1 \geq \pi(x)_2 \geq \ldots \geq \pi(x)_n$$

and $\Delta$ be a sufficiently large offset that causes the sigmoid units to saturate. In an embodiment, one may take $\Delta=7$.

For example, an embodiment uses $v_\ell = -\pi(x)_k - \Delta$ for the initial lower bound. This makes $\sigma(x_j+v_\ell) \approx 0$ for $x_j \in \pi(x)_{k,\ldots,n}$ and $0 < \sigma(x_j+v_\ell) < 1$ for $x_j \in \pi(x)_{1,\ldots,k-1}$, and thus $g(v_\ell) \leq -1 \leq 0$, and uses $v_u = -\pi(x)_{k+1} + \Delta$ for the initial upper bound. This makes $\sigma(x_j+v_u) \approx 1$ for every $x_j \in \pi(x)_{1,\ldots,k+1}$ and thus $g(v_u) \geq 1 \geq 0$.

Using a projection unit that optimizes the projection layer one can use the projection layer in a forward pass, at any location in the neural network. For example, if the optimization using a dual variable is use, one may use the following algorithm for the forward pass Input: $x \in \mathbb{R}^n$ Forward Pass 1. Optimize v* with and compute the output as $y^* = \sigma(x+v^*)$ In an embodiment, optimizing the layer loss function includes applying an iterated approximation algorithm to obtain the layer output vector y. The iterated approximation algorithm may optimize the dual variable v, or it may optimize the layer loss function directly. In case a dual variable v is used one may optimize the layer loss function by optimizing the scalar dual variable v. In that case, the layer output vector may be computed by applying a function to the layer input vector and the optimized scalar, e.g., $y_i^* = \sigma(x_i+v^*)$.

In an embodiment, the following forward pass algorithm may be implemented as:

Forward Pass (Inference)

Input: $x \in R^n$ and k<n

Hyper parameters: $\Delta > \epsilon > 0$ and d≥2, e.g., $\Delta=7$, $\epsilon=10^{-3}$ and d=10.

Figure 2A:
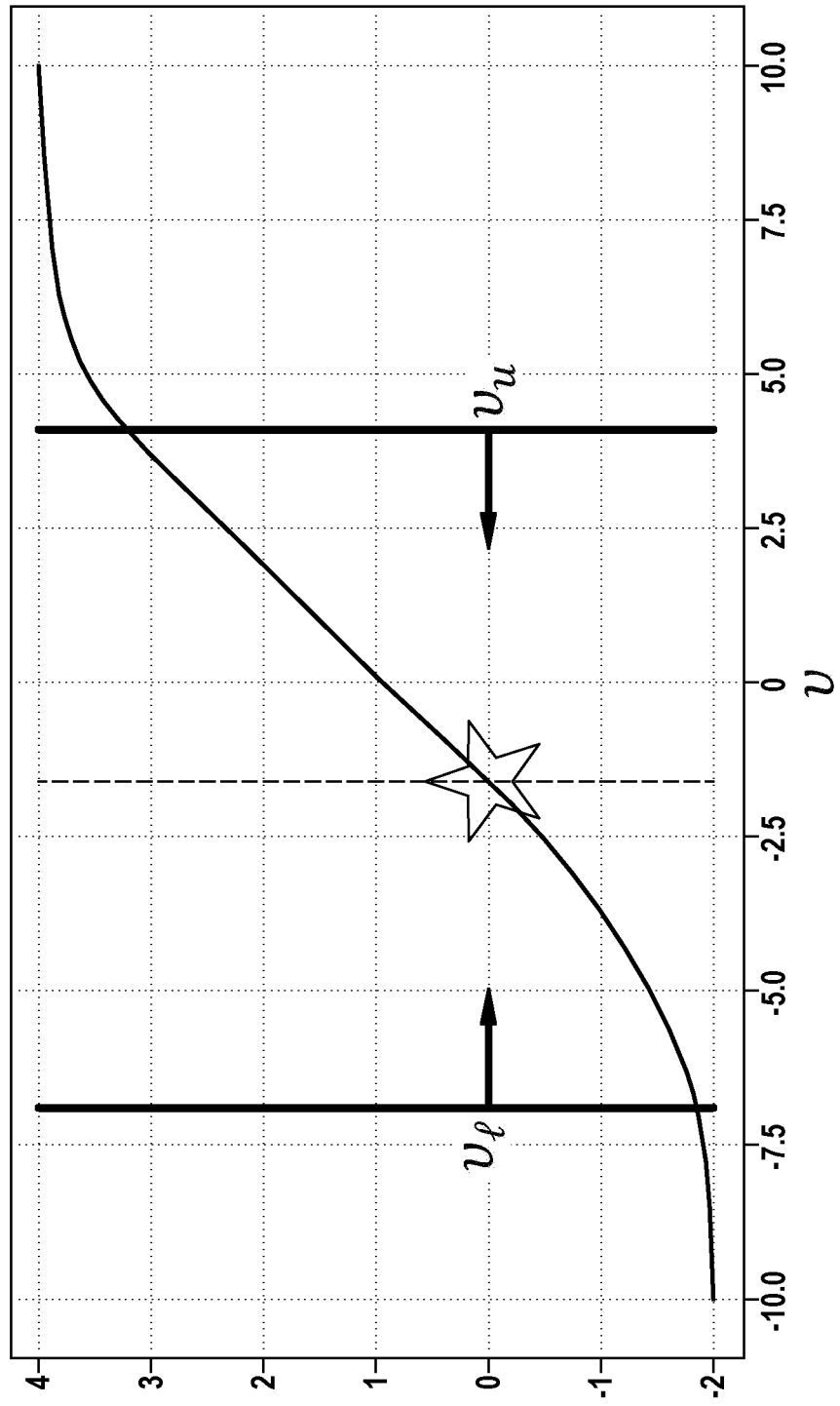

Algorithm:
1. Store in x' = sort(x) a sorted copy of x with $x'_1 \geq \ldots \geq x'_n$.
2. Set $v_\ell = -x'_k - \Delta$ and $v_u - x'_{k+1} + \Delta$, which are lower/upper bounds of $v^*$.
3. Sample the interval $[v_\ell; v_u]$ linearly to obtain $v_l = \mu_1 < \ldots < \mu_d = v_u$.
4. Compute (ideally in parallel) $\phi_i = g(\mu_i)$ for i = 1, . . . , d.
5. Let j = argmax $\{1 \leq i \leq d | \phi_i < k\}$ and update $v_\ell = \mu_j$ and $v_u = \mu_{j+1}$.
6. If $v_u - v_\ell > \epsilon$ goto Step 3.
7. Set $t = \dfrac{k - \phi_j}{\phi_{j+1} - \phi_j}$ and set $v^* = (1 - t)v_l + tv_u$.
8. Set $y \in R^n$ as $y_i = \sigma(x_i + v^*)$ for i = 1, . . . , n.
Output: $y \in R^n$ Forward pass algorithms such as above may be varied in many ways. For example, instead of linearly sampling other sampling may be used. Instead of interpolating in step 7, one may take one of the bounds, etc., FIG. 2a schematically shows an example of an embodiment of optimizing a dual variable. FIG. 2a shows the function g as a function of v.

Figure 2B:
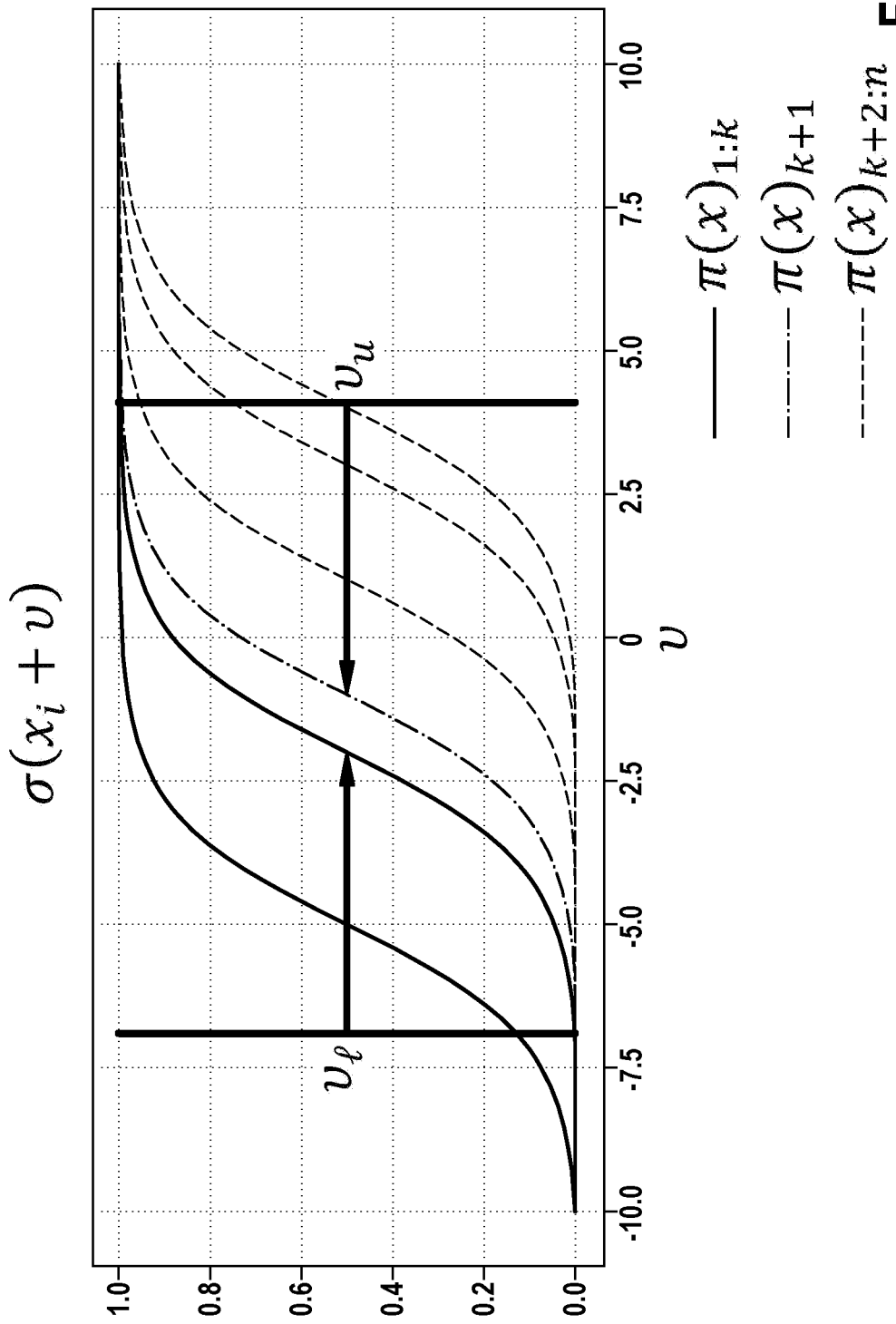

FIG. 2b schematically shows an example of a decomposition of the individual logistic functions that contribute to a function g(v).

The example shown in FIGS. 2a and 2b finds the optimal dual variable v with $x \in \mathbb{R}^6$ and k=2 by solving the root-finding problem g(v)=0, which is shown in FIG. 2a. The right shows the decomposition of the individual logistic functions that contribute to g(v). We show the initial lower and upper bounds described above. Clearly optimizing a scalar v is much more efficient than optimizing over a multi-dimensional vector x.

The projection layer can easily fit in a backpropagation layer, since errors can be back propagated across the projection layer. For example, the following algorithm may be used:
Backward Pass (Training)
Input: Backpropagated error $\delta \in R^n$ as well as x, $y \in R^n$ from the forward pass.

Algorithm:
1. Compute h, $a \in R^n$ with $h_i = \dfrac{1}{y_i} + \dfrac{1}{1-y_i}$ and $a_i = \dfrac{1}{h_i}$
2. Define $d_v = \dfrac{\sum_{i=1}^n \delta_i a_i}{\sum_{i=1}^n a_i}$
3. Define $\eta \in R^n$ with $\eta_i = a_i \cdot (d_v - \delta_i)$
Output: $-\eta \in R^n$ Using the above algorithm an error vector $\delta$ can be backpropagated to a vector $\eta$. The latter may be used to train the layer before the projection layer, e.g., using further backpropagation.

In case the projection layer is the last layer, then the backpropagated error $\delta \in R^n$ may be taken as the difference between the output y during the forward pass and the true answer in the training data. The true answer may preferably be the ground truth, but the true answer may be incomplete compared to the ground truth. For example, even if k labels are desired in the output of the network, the training data may not always have k labels available, but fewer.

For example, in an embodiment the projection layer is the last layer and has an output vector y, e.g., the solution of the optimization $y^*=\sigma(x+v^*)$. A loss function may be define that indicates the error of the network, for example, $\ell = \sum_{i=1}^n t_i \log(y_i)+(1-t_i)\log(1-y_i)$, wherein $t_i$ is the ground truth, or at least the true output according to the training data. For example, vector t with coefficients $t_i$ may be a 0-1 vector that indicates which labels, e.g., which classifications apply. For this particular loss function, one may derive that $$\nabla_{y^*} \ell = \frac{t}{y^*} - \frac{1-t}{1-y^*},$$

e.g., the gradient of the loss function with respect to y. The latter vector can be computed from the forward pass output and the ground truth. For example, the $\nabla_{y^*} \cdot \ell$ may be taken as the vector $\delta$ in the above algorithm.

The new projection layer may be included in any neural network architecture, including forward networks as well recurrent networks. For example, the backward pass also may be described as below, which may be applied to different loss functions $\ell$.
Backward Pass
1. $h=(y^*)^{-1}+(1-y^*)^{-1}$
2. $d_v=(1^T h^{-1})^{-1} h^{-T}(\nabla_{y^*} \cdot \ell)$
3. $d_y=h^{-1} \circ (d_v - \nabla_{y^*} \cdot \ell)$
4. $\nabla_x \ell = -d_y$ Wherein $\ell$ represents the layer loss function. Backpropagating through the LML layer may derived as follows: Let $y^* = \Pi_{\mathcal{L}_k}(x)$ be outputs of the LML layer. Integrating this layer into a gradient-based end-to-end learning system may require that we compute the derivative $$\frac{\partial \ell}{\partial x} = \frac{\partial \ell}{\partial y^*} \frac{\partial y^*}{\partial x},$$

where $\ell$ is the loss function. The LML projection $\Pi_{\mathcal{L}_k}(x)$ does not have an explicit closed-form solution and one therefore cannot use an autodiff framework to compute the gradient $\partial y^*/\partial x$. We note that even though the solution can be represented as $y^*=\sigma(x+v^*)$, differentiating this form is still difficult because $v^*$ is also a function of x. Instead, KKT conditions are implicitly differentiated. The following linear system can be solved:

$$\begin{bmatrix} H & -1 \\ -1^T & 0 \end{bmatrix} \begin{bmatrix} d_y \\ d_v \end{bmatrix} = -\begin{bmatrix} \nabla_{y^*} \ell \\ 0 \end{bmatrix} \quad (7)$$

where $H=\nabla_y^2 L(y, v)$ is defined by H=diag(h) and $$h = \frac{1}{y^*} + \frac{1}{1-y^*}. \quad (8)$$

The system in can be solved analytically with $$d_v = \frac{1}{1^T h^{-1}} h^{-T}(\nabla_{y^*} \ell) \text{ and} \quad (9)$$
$$d_y = h^{-1} \circ (d_v - \nabla_{y^*} \ell)$$

where $\circ$ is the elementwise product and $h^{-1}$ is the elementwise inverse. Finally, we have that $\nabla_x \ell = -d_y$.

Figure 3A:
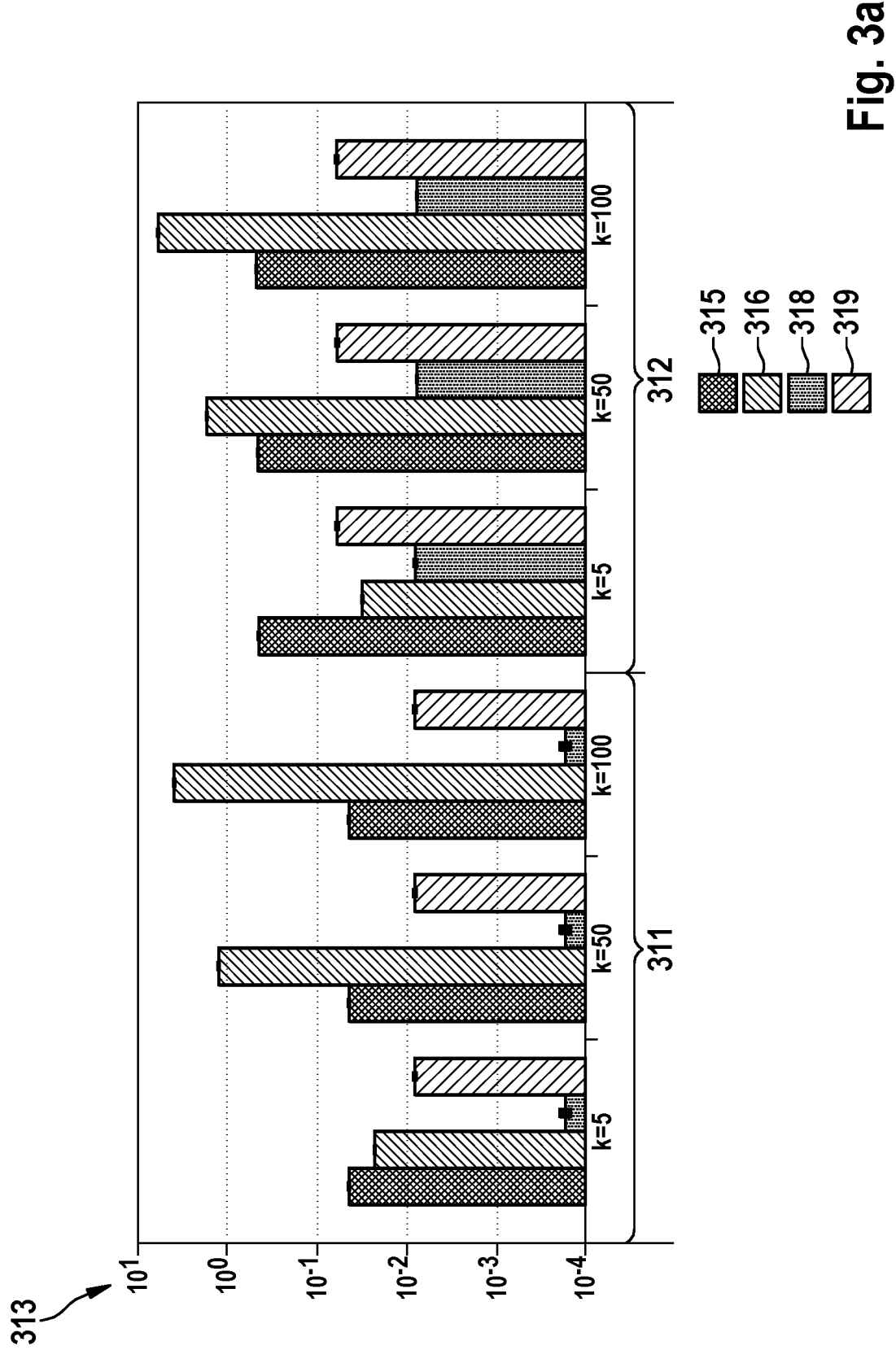
Figure 3B:
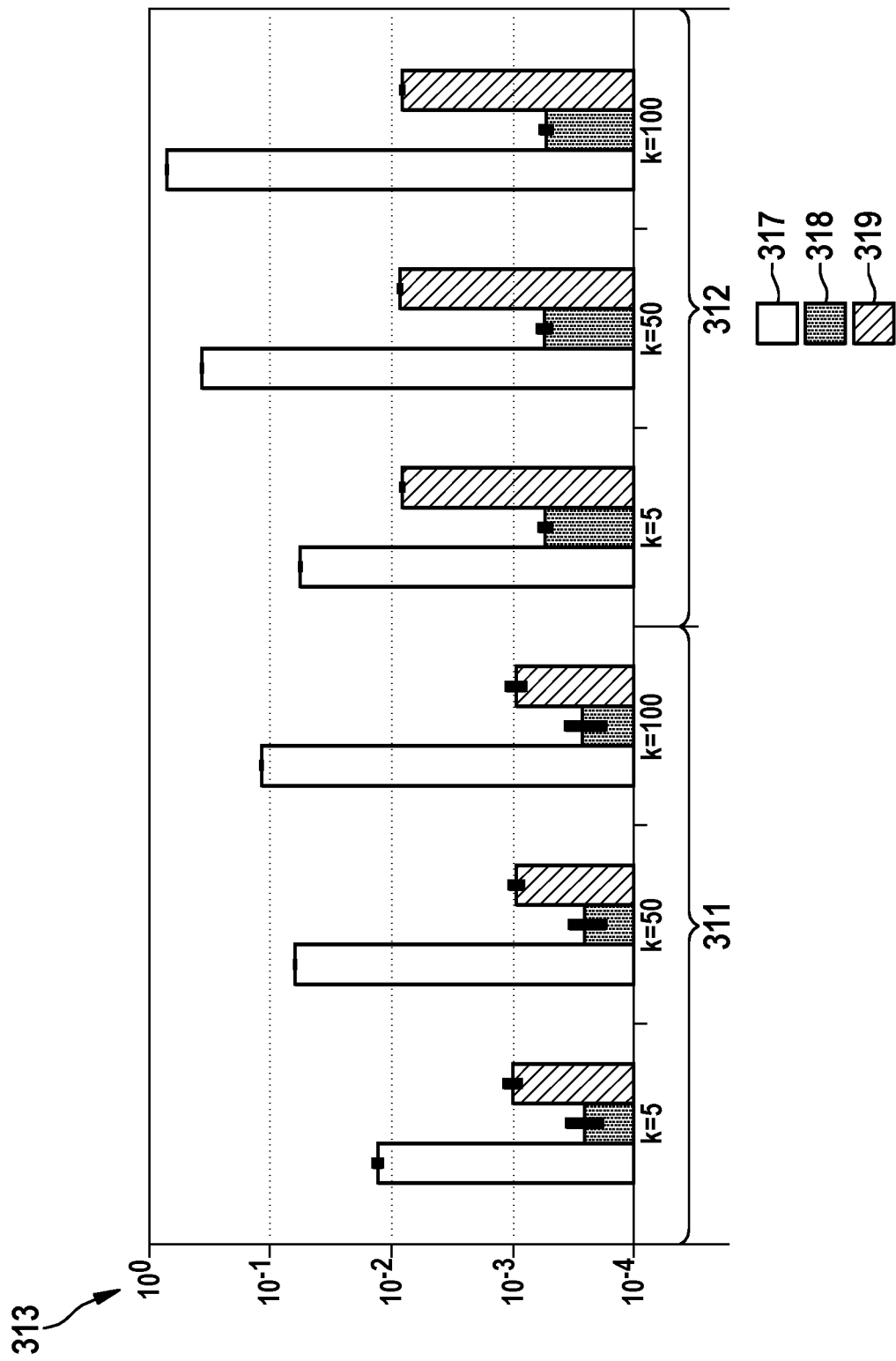

FIGS. 3a and 3b show timing performance results. FIG. 3a schematically shows timing performance results for forward time in an example of an embodiment. FIG. 3b schematically shows timing performance results for backward time in an example of an embodiment.

Shown in FIGS. 3a and 3b are results for 1000 classes 311 and for 10000 classes 312. On the vertical axis is shown Time (s) 313. Timing results are shown for Smooth SVM, in particular for SA 315, DC 316, and also for $Ent_{tr}$ 318 and LML 319. FIG. 3b shows the backward timing results 317 of Smooth SVM. The LML 319 results are for an embodiment.

The timing performance of an LML projection layer is compared to Smooth SVM loss from "Smooth loss functions for deep top-k classification" by Berrada, et al., included herein by reference. The Summation Algorithm (SA) and Divide-and-Conquer (DC) algorithms for the Smooth SVM loss are further described in Berrada. Timing performance is also compared to the truncated top-k entropy $Ent_{tr}$ from "Top-k multiclass svm", by Lapin, M. et al., included herein by reference. To measure the performance, a minibatch size of 256 and 50 trial runs 50 for each data point was used. All or most of the experiments were run on an unloaded NVIDIA GeForce GTX 1080 Ti GPU.

FIGS. 3a and 3b show the performance results on problems with a minibatch size of 256 and highlights the minimal overhead of the LML layer. In nearly all instances, the LML layer outperforms the Smooth SVM forward and backward passes. Notably, the LML backward pass is significantly faster in all or most cases. The forward pass of the smooth SVM becomes computationally expensive as k grows while the LML layer's performance remains constant. The top-k entropy loss is bottlenecked by a sorting operation and significantly outperforms both the Smooth SVM and LML layers.

In nearly all instances, the LML layer outperforms the Smooth SVM forward and backward passes. Notably, the LML backward pass is significantly faster in all or most cases. The forward pass of the smooth SVM becomes computationally expensive a k grows while the LML layer's performance remains constant.

An embodiment of the projection layer may be used in various applications of neural networks, especially networks trained for classifying inputs. The projection layer performs especially well if multiple labels are to be derived from the input, either in the situation were the input naturally allows multiple labels, or in situations in which a top-k prediction is to be made. Without a projection layer the network does not assimilate information about the nature of the desired outputs, i.e., that desired outputs have the k labels.

The number of labels may preferably be fixed. For example, the summation parameter may be fixed by making an educated guess about the number of labels, by selecting an upper bound for the number of desired labels. The parameter may be selected by another function, e.g., a function configured to select regions of interest in an input. If desired multiple network for multiple values of k may be trained and then selected by the other function used. Or a network may be used for a larger k, and the result thereof may be truncated.

Furthermore, the projection layer performs especially well in situations where multiple labels are to be predicted but where ground truth information is not available. For example, for a sensor data, say for an image, potentially many labels could be applied to the picture. It is hard to obtain large amounts of training data, e.g., images, in which all or most possible labels have been correctly applied. However, the projection layer learns well in case it is trained with a sub-set of the applicable labels. For example, a network that is trained for k outputs, say for 10 outputs, may be trained on sensor data, e.g., images, for which fewer than 10 correct labels are known. Nevertheless, the network will converge to output 10 applicable labels for the sensor data.

For example, in an embodiment, the training data may comprise sensor data annotated with one or more labels. The neural network may be trained to generate a number of labels given sensor data in accordance with the training data, wherein the number of labels equals the summing parameter k.

In an embodiment, the neural network is configured for multi-label classification where the training data has an incomplete subset of the true labels and it is desired to model the task by predicting a set of exactly k labels. For example, the training data may be annotated with incomplete label information, e.g., for at least part of the sensor data in the training data fewer than k labels are available for training. This setting comes up in practice for predicting the top-k labels in image classification and in predicting a set of k relationships in a graph for scene graph generation, etc.

Scene graph generation is the task of generating a set of objects and relationships between them from an input image and has been extensively studied recently. We refer for background and notation to "Neural motifs: Scene graph parsing with global context", by Zellers et al., included herein by reference and referred to as Zellers and its model as Neural motifs. A scene graph may be generated by creating object- and edge-level contexts.

Figure 3C:
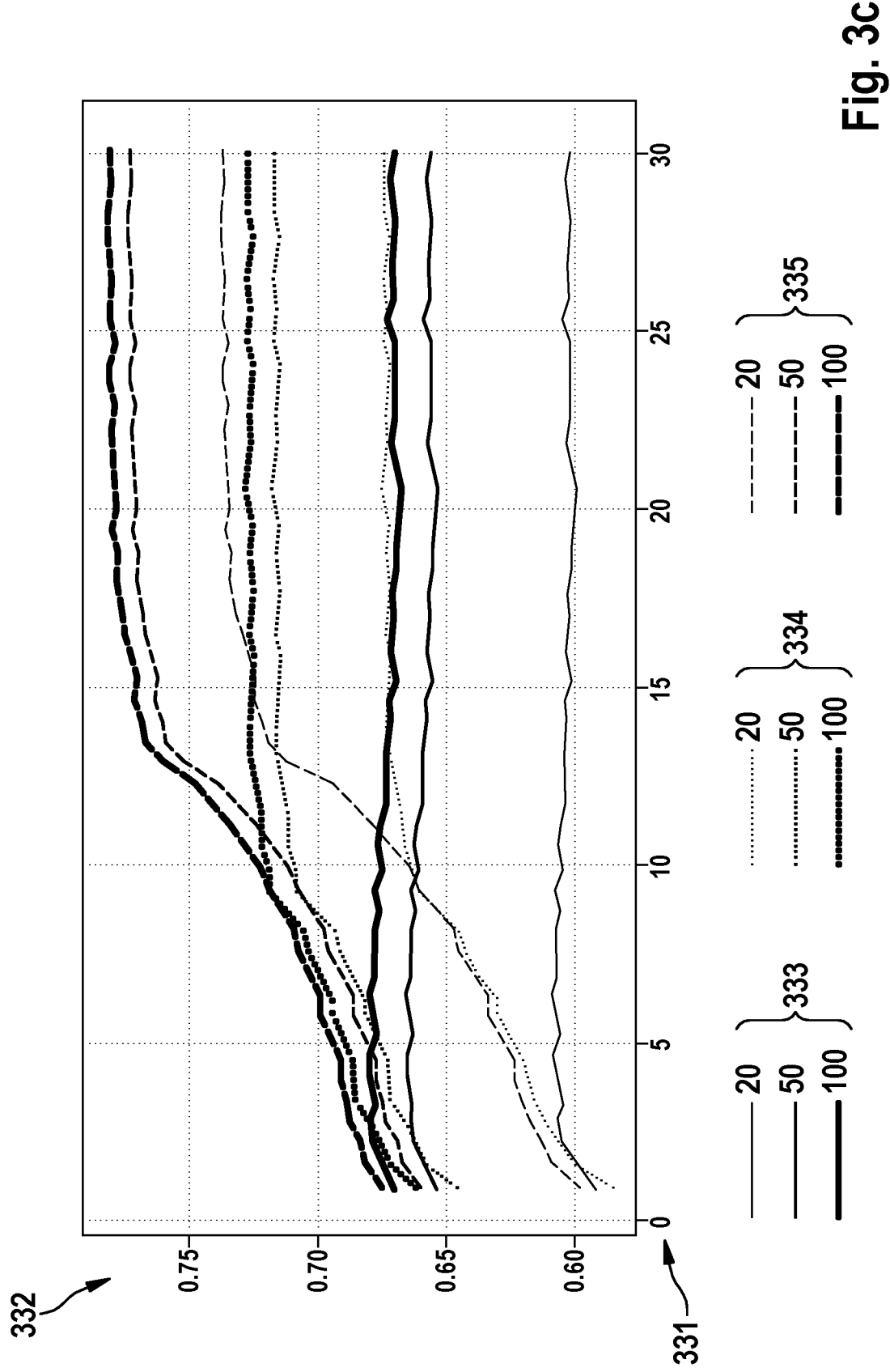

In particular, the relationship prediction portion of Zellers may be improved by using a projection layer, e.g., using a method that fully enumerates all or most of the possible relationships. FIG. 3c empirically demonstrates that this improves the representational capacity of Neural Motifs.

FIG. 3c schematically shows an example of training recall for an embodiment of scene graph generation on the visual genome. FIG. 3c shows training progress comparing the conventional Neural Motif model, and to the $Ent_{tr}$ and LML versions.

The vertical axis 332 shows recall, the horizontal axis 331 shows the number of epochs. Results are shown for Zellers et al. 333, $Ent_{tr}$ 334 and for an embodiment of LML 335. FIG. 3c shows the evaluation for the so-called constrained graph generation problems in which the graph is constrained to have at most a single relationship present at each edge. FIG. 3c shows that the LML approach adds significant representational capacity for constrained graph generation.

A scene graph generation method takes sensor data, e.g., an image as input and outputs a graph of the objects in the image, e.g., the nodes of the graph, and the relationships between them, e.g., the edges of the graph.

The scene graph generation task may be decomposed as $$P(G|I)=P(B|I)P(O|B,I)P(R|B,O,I)$$

where G is the scene graph, I is the input image, B is a set of region proposals, and O is a set of object proposals. The relationship generation process P(R|B, O, I) may make an independence assumption that, given a latent variable z that is present at each edge as $z_{ij}$, the relationships on each edge are independent. That is, $$P([x_{i \to j}]_{ij}|z,B,O,I)=\Pi_{i,j}|z_{ij},B,O,I),$$

where the set of relationships between all or most of the nodes is $R=[x_{i \to j}]_{ij}$.

Neural Motifs models these probabilities with $$P(x_{i \to j}|B,O,I)=\hat{p}_{ij} \triangleq \text{softmax}(z_{ij}) \in \Delta_n, \quad (11)$$

where n is the number of relationships for the task. The predictions are made in the n-simplex instead of the (n−1)-simplex because an additional class is added to indicate that no relationship is present on the edge. For inference, graphs may be generated by selecting the relationships that have the highest probability by concatenating all or most $p_{ij}$ and selecting the top k. Typical values of k are 20, 50, and 100. The method is then evaluated on the top-k recall of the scene graphs; i.e. the number of ground-truth relationships that are in the neural network's top-k relationship predictions.

The evaluation metric of generating a graph with k relationships is not part of the training procedure of Neural Motifs since that just treats each edge as a classification problem that maximizes the likelihood of the observed relationships.

Using an LML layer to predict all or most of the relationship probabilities jointly overcomes these drawbacks. The joint probability may be modelled as $$P([x_{i \to j}]_{ij}|z, B, O, I) = \Pi_{\mathcal{L}_k}(\text{cat}([z_{ij}]_{ij})) \quad (12)$$

where cat is the concatenation function. This is now a top-k recall problem that can be trained by maximizing the likelihood of the observed relationships.

Introducing the knowledge of predicting k nodes into the training procedure improves the training recall as is seen in FIG. 3c. In an embodiment, the training data includes sensor data annotated with objects and relationships between the objects. The network may be configured to generate a set of relationships for the edges of the scene graph, the set having a number of elements equal to the summing parameter.

The trained neural network device may be applied in an autonomous device controller. For example, the input data of the neural network may comprise sensor data of the autonomous device. The autonomous device may perform movement at least in part autonomously, e.g., modifying the movement in dependence on the environment of the device, without a user specifying the modification. For example, the device may be a computer-controlled machine, like a car, a robot, a vehicle, a domestic appliance, a power tool, a manufacturing machine, etc. For example, the neural network may be configured to classify objects in the sensor data. The autonomous device may be configured for decision making depending on the classification. For example, if the network may classify objects in the surrounding of the device and may stop, or decelerate, or steer or otherwise modify the movement of the device, e.g., if other traffic is classified in the neighborhood of the device, e.g., a person, cyclist, a car, etc.

In the various embodiments of system 100 and 150, the communication interfaces may be selected from various alternatives. For example, the interface may be a network interface to a local or wide area network, e.g., the Internet, a storage interface to an internal or external data storage, a keyboard, an application interface (API), etc.

The systems 100 and 150 may have a user interface, which may include well-known elements such as one or more buttons, a keyboard, display, touch screen, etc. The user interface may be arranged for accommodating user interaction for configuring a generator and discriminator networks, training the networks on a training set, or applying the generator network to new sensor data.

Storage may be implemented as an electronic memory, say a flash memory, or magnetic memory, say hard disk or the like. Storage may comprise multiple discrete memories together making up storage 110. Storage may comprise a temporary memory, say a RAM. The storage may be cloud storage.

System 100 may be implemented in a single device. System 150 may be implemented in a single device. Typically, the system 100 and 150 each comprise a microprocessor which executes appropriate software stored at the system; for example, that software may have been downloaded and/or stored in a corresponding memory, e.g., a volatile memory such as RAM or a non-volatile memory such as Flash. Alternatively, the systems may, in whole or in part, be implemented in programmable logic, e.g., as field-programmable gate array (FPGA). The systems may be implemented, in whole or in part, as a so-called application-specific integrated circuit (ASIC), e.g., an integrated circuit (IC) customized for their particular use. For example, the circuits may be implemented in CMOS, e.g., using a hardware description language such as Verilog, VHDL, etc. In particular, systems 100 and 150 may comprise circuits for the evaluation of neural networks.

A processor circuit may be implemented in a distributed fashion, e.g., as multiple sub-processor circuits. A storage may be distributed over multiple distributed sub-storages. Part or all of the memory may be an electronic memory, magnetic memory, etc. For example, the storage may have volatile and a non-volatile part. Part of the storage may be read-only.

Figure 4:
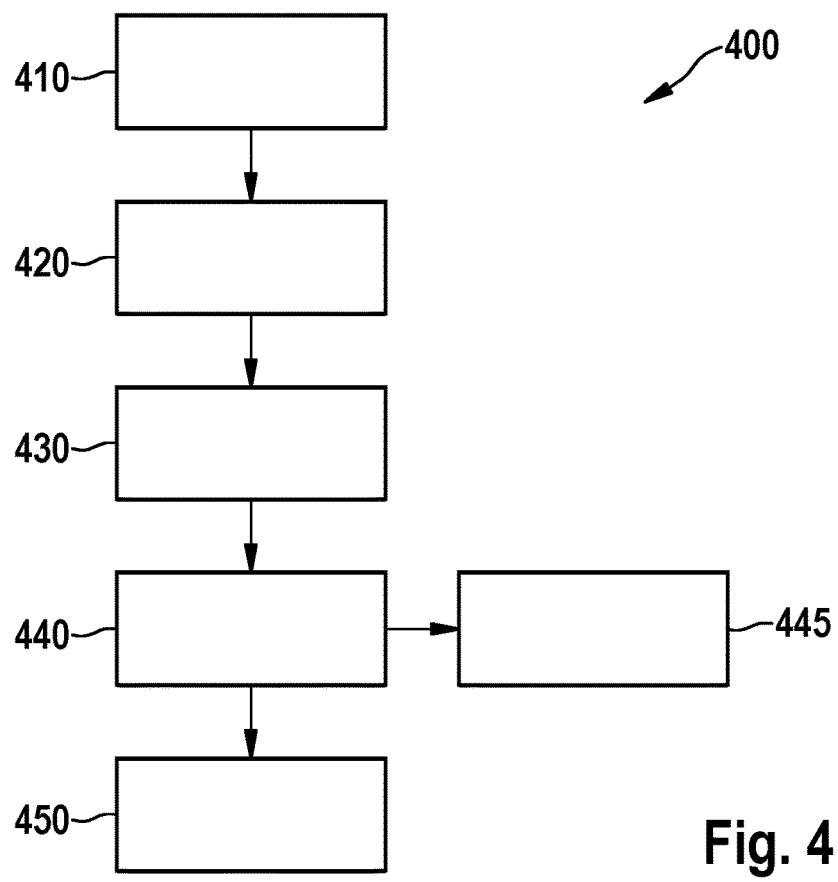

FIG. 4 schematically shows an example of an embodiment of a neural network method 400 for training a neural network. Method 400 includes accessing 410 training data, storing 420 parameters for multiple layers of the sequence of neural network layers, apply 430 the sequence of neural network layers to data of the training data, and adjust 450 the stored parameters to reduce a network loss function, wherein at least one layer of the sequence of neural network layers is a projection layer, the projection layer being configured for a summing parameter k applying the projection layer includes projecting 440 a layer input vector x of the projection layer to a layer output vector y, the projecting including optimizing 445 a layer loss-function applied to the layer output vector subject to the condition that the projection layer output vector y sums to the summing parameter k, wherein the layer loss-function includes a regulating term $-H_b(y)$ and a projection term $-\langle x, y \rangle$.

Figure 5:
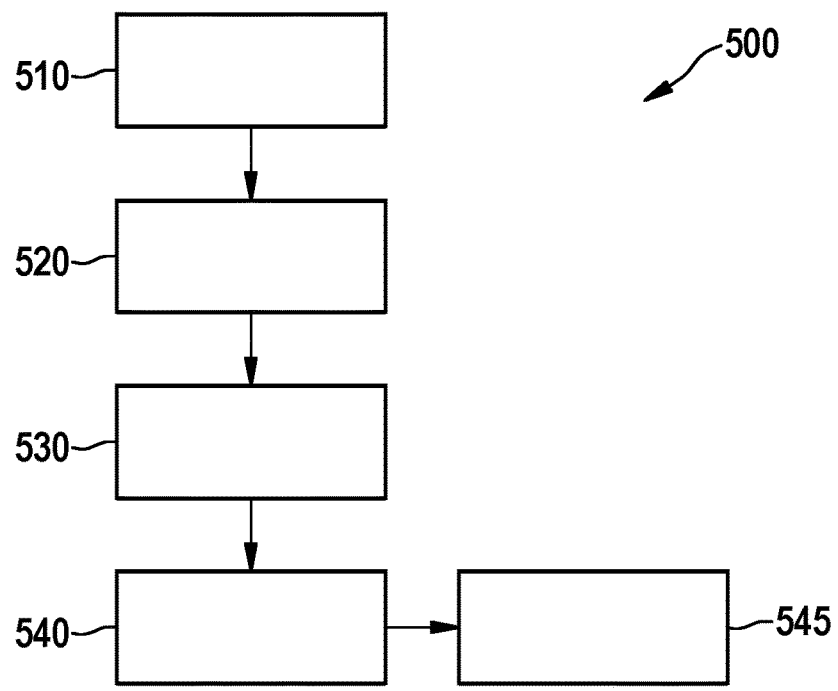

FIG. 5 schematically shows an example of an embodiment of a neural network method 500 for applying a trained neural network. Method 500 includes receiving 510 input data, storing 520 trained parameters for multiple layers of the sequence of neural network layers, applying 530 the sequence of neural network layers to the input data, wherein at least one layer of the sequence of neural network layers is a projection layer, the projection layer being configured for a summing parameter k, applying the projection layer includes projecting 54 a layer input vector x of the projection layer to a layer output vector y, the projecting including optimizing 545 a layer loss-function applied to the layer output vector subject to the condition that the projection layer output vector y sums to the summing parameter k, wherein the layer loss-function includes a regulating term $-H_b(y)$ and a projection term $-\langle x, y \rangle$.

For example, the neural network training method for training a neural network, and the neural network method for applying a trained neural network, may be computer implemented methods. For example, accessing training data, and/or receiving input data may be done using a communication interface, e.g., an electronic interface, a network interface, a memory interface, etc. For example, storing or retrieving parameters may be done from an electronic storage, e.g., a memory, a hard drive, etc. For example, applying the sequence of neural network layers to data of the training data, and/or adjusting the stored parameters to train the network may done using an electronic computing device, e.g., a computer.

The neural network, either during training and/or during applying may have multiple layers, which may include one or more projection layers, and one or more non-projection layers, e.g., convolutional layers and the like. For example, the neural network may have at least 2, 5, 10, 15, 20 or 40 hidden layers, or more, etc. The number of neurons in the neural network may, e.g., be at least 10, 100, 1000, 10000, 100000, 1000000, or more, etc.

Many different ways of executing the method are possible, as will be apparent to a person skilled in the art. For example, the order of the steps can be performed in the shown order, but the order of the steps can be varied or some steps may be executed in parallel. Moreover, in between steps other method steps may be inserted. The inserted steps may represent refinements of the method such as described herein, or may be unrelated to the method. For example, some steps may be executed, at least partially, in parallel. Moreover, a given step may not have finished completely before a next step is started.

Embodiments of the method may be executed using software, which includes instructions for causing a processor system to perform method 400 and/or 500 Software may only include those steps taken by a particular sub-entity of the system. The software may be stored in a suitable storage medium, such as a hard disk, a floppy, a memory, an optical disc, etc. The software may be sent as a signal along a wire, or wireless, or using a data network, e.g., the Internet. The software may be made available for download and/or for remote usage on a server. Embodiments of the method may be executed using a bitstream arranged to configure programmable logic, e.g., a field-programmable gate array (FPGA), to perform the method.

It will be appreciated that the presently disclosed subject matter also extends to computer programs, particularly computer programs on or in a carrier, adapted for putting the presently disclosed subject matter into practice. The program may be in the form of source code, object code, a code intermediate source, and object code such as partially compiled form, or in any other form suitable for use in the implementation of an embodiment of the method. An embodiment relating to a computer program product includes computer executable instructions corresponding to each of the processing steps of at least one of the methods set forth. These instructions may be subdivided into subroutines and/or be stored in one or more files that may be linked statically or dynamically. Another embodiment relating to a computer program product includes computer executable instructions corresponding to each of the means of at least one of the systems and/or products set forth.

Figure 6A:
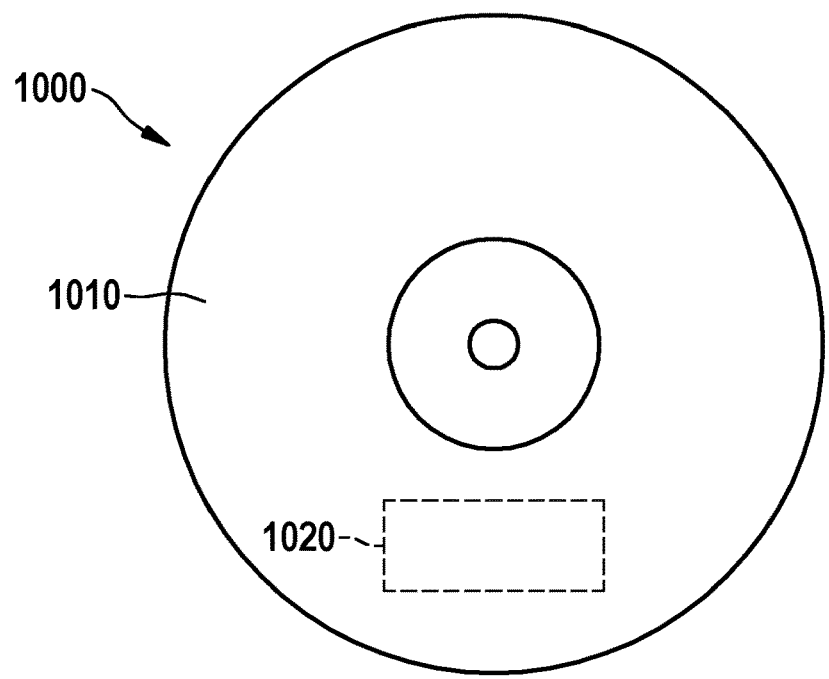

FIG. 6a shows a computer readable medium 1000 having a writable part 1010 including a computer program 1020, the computer program 1020 including instructions for causing a processor system to perform a method of training and/or applying a neural network, according to an embodiment. The computer program 1020 may be embodied on the computer readable medium 1000 as physical marks or by means of magnetization of the computer readable medium 1000. However, any other suitable embodiment is conceivable as well. Furthermore, it will be appreciated that, although the computer readable medium 1000 is shown here as an optical disc, the computer readable medium 1000 may be any suitable computer readable medium, such as a hard disk, solid state memory, flash memory, etc., and may be non-recordable or recordable. The computer program 1020 includes instructions for causing a processor system to perform the method of training and/or applying a neural network.

Figure 6B:
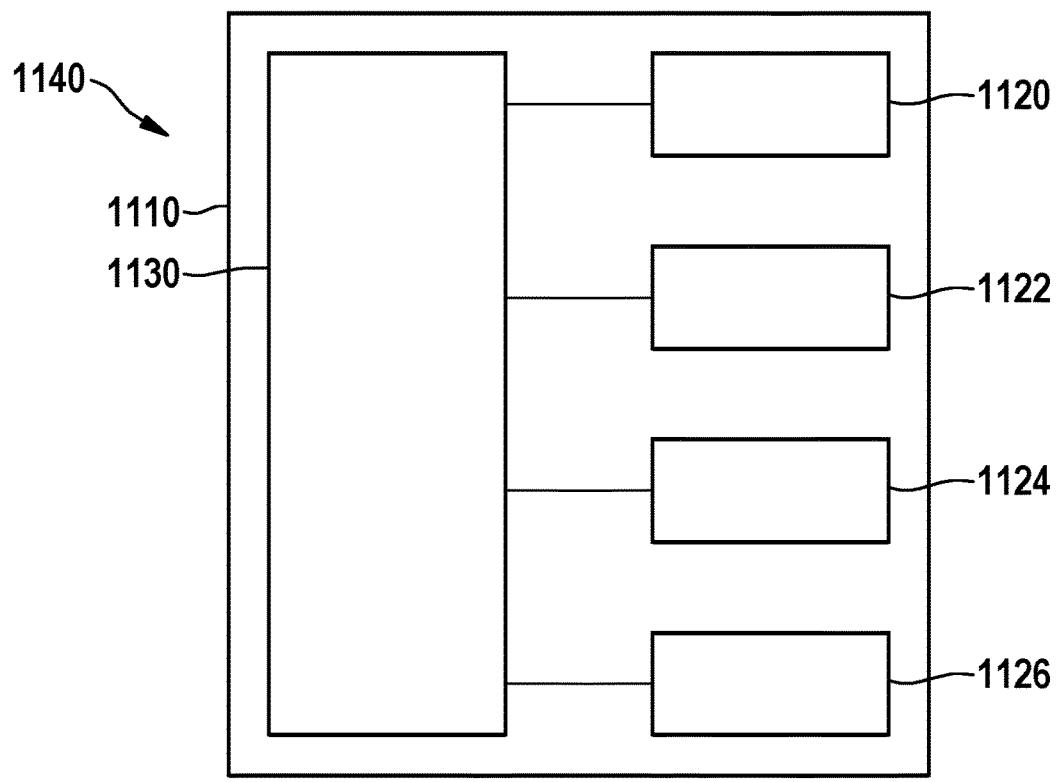

FIG. 6b shows in a schematic representation of a processor system 1140 according to an embodiment of a training and/or application device for a neural network. The processor system includes one or more integrated circuits 1110. The architecture of the one or more integrated circuits 1110 is schematically shown in FIG. 6b. Circuit 1110 includes a processing unit 1120, e.g., a CPU, for running computer program components to execute a method according to an embodiment and/or implement its modules or units. Circuit 1110 includes a memory 1122 for storing programming code, data, etc. Part of memory 1122 may be read-only. Circuit 1110 may comprise a communication element 1126, e.g., an antenna, connectors or both, and the like. Circuit 1110 may comprise a dedicated integrated circuit 1124 for performing part or all of the processing defined in the method. Processor 1120, memory 1122, dedicated IC 1124 and communication element 1126 may be connected to each other via an interconnect 1130, say a bus. The processor system 1110 may be arranged for contact and/or contact-less communication, using an antenna and/or connectors, respectively.

For example, in an embodiment, processor system 1140, e.g., the training and/or application device may comprise a processor circuit and a memory circuit, the processor being arranged to execute software stored in the memory circuit. For example, the processor circuit may be an Intel Core i7 processor, ARM Cortex-R8, etc. In an embodiment, the processor circuit may be ARM Cortex M0. The memory circuit may be an ROM circuit, or a non-volatile memory, e.g., a flash memory. The memory circuit may be a volatile memory, e.g., an SRAM memory. In the latter case, the device may comprise a non-volatile software interface, e.g., a hard drive, a network interface, etc., arranged for providing the software.

It should be noted that the above-mentioned embodiments illustrate rather than limit the presently disclosed subject matter, and that those skilled in the art will be able to design many alternative embodiments.

In the claims, any reference signs placed between parentheses shall not be construed as limiting the claim. Use of the verb 'comprise' and its conjugations does not exclude the presence of elements or steps other than those stated in a claim. The article 'a' or 'an' preceding an element does not exclude the presence of a plurality of such elements. Expressions such as "at least one of" when preceding a list of elements represent a selection of all or of any subset of elements from the list. For example, the expression, "at least one of A, B, and C" should be understood as including only A, only B, only C, both A and B, both A and C, both B and C, or all of A, B, and C. The presently disclosed subject matter may be implemented by hardware including several distinct elements, and by a suitably programmed computer. In the device claim enumerating several means, several of these means may be embodied by one and the same item of hardware. The mere fact that certain measures are recited in mutually different dependent claims does not indicate that a combination of these measures cannot be used to advantage.

In the claims, references in parentheses refer to reference signs in drawings of exemplifying embodiments or to formulas of embodiments, thus increasing the intelligibility of the claim. These references shall not be construed as limiting the claim.

LIST OF REFERENCE NUMERALS 100 a neural network training device
120 a sequence of neural network layers 130 a backpropagation unit
121, 122 a neural network layer
144 a projection layer
125, 126 a communication interface
132 a training storage
134 a neural network storage
140 an application unit
142 a projection layer unit
146 a backpropagation unit for a projection layer
311 1000 classes
312 10000 classes
313 Time (s)
315 SA
316 DC
317 Backward
318 $Entr_{tr}$
319 LML
331 Epoch
332 Recall
333 Zellers et al
334 $Entr_{tr}$
335 LML
1000 a computer readable medium
1010 a writable part
1020 a computer program
1110 integrated circuit(s)
1120 a processing unit
1122 a memory
1124 a dedicated integrated circuit
1126 a communication element
1130 an interconnect
1140 a processor system

The invention claimed is:

1. A neural network training device for training a neural network for classifying objects, the neural network including a sequence of neural network layers, the device comprising:
a communication interface for accessing training data comprising object classifications;
a non-transitory neural network storage configured to store parameters for multiple layers of the sequence of neural network layers; and
a processor system configured to
apply the sequence of neural network layers to data of the training data, and adjust the stored parameters to train the network, wherein
at least one layer of the sequence of neural network layers, both during training and in the trained neural network, is a projection layer, the projection layer being configured for a summing parameter and is configured to project a layer input vector of the projection layer to a projection layer output vector in a limited multi label (LML) polytope which is a set of points in a unit hypercube with coordinates that sum to the summing parameter, the summing parameter being at least 2, the projecting including optimizing a layer loss-function applied to the projection layer output vector subject to the condition that the projection layer output vector sums to the summing parameter, wherein the layer loss-function includes a regulating term and a projection term, wherein optimizing the layer loss function includes applying an iterated approximation algorithm to obtain the projection layer output vector.

2. The training device according to claim 1, wherein the regulating term is a sum of a function applied to the coefficients of the projection layer output vector, the function being convex, continuous and having a minimum for an input between 0 and 1, and/or
the projection term is linear and minimal, over vectors of unit length, for a vector in the same direction as the layer input vector.

3. The training device according to claim 1, wherein the projection layer is a final layer of the sequence of neural network layers.

4. The training device according to claim 1, wherein the training data includes sensor data annotated with one or more training labels, the neural network being trained to generate a number of generated labels given sensor data in accordance with the training data, wherein the number of generated labels equals the summing parameter.

5. The training device according to claim 4, wherein for at least part of the sensor data in the training data the number of generated labels is less than the summing parameter.

6. The training device according to claim 1 for use in a scene graph generation task, the training data including sensor data annotated with objects and relationships between the objects, the network being configured to generate a set of relationships for edges of the scene graph, the set having a number of elements equal to the summing parameter.

7. The training device according to claim 1, wherein optimizing the layer loss function includes optimizing a scalar, wherein the projection layer output vector is computed by applying a function to the layer input vector and the optimized scalar.

8. The training device according to claim 7, wherein upper and/or lower bounds for the scalar are obtained by sorting the layer input vector, selecting a component and adding and/or subtracting a value.

9. The training device according to claim 7, wherein optimizing the scalar is a bisection method.

10. A neural network applying device for applying a trained neural network for classifying objects, the neural network including a sequence of neural network layers, the device comprising:
a communication interface for receiving input data;
a non-transitory neural network storage configured to store trained parameters for multiple layers of the sequence of neural network layers; and
a processor system configured to apply the sequence of neural network layers to the input data, wherein
at least one layer of the sequence of neural network layers, both during training and in the trained neural network, is a projection layer, the projection layer being configured for a summing parameter, the summing parameter being at least 2, and is configured to project a layer input vector of the projection layer to a projection layer output vector in a limited multi label (LML) polytope which is a set of points in a unit hypercube with coordinates that sum to the summing parameter, the projecting including optimizing a layer loss-function applied to the projection layer output vector subject to the condition that the projection layer output vector sums to the summing parameter, wherein the layer loss-function includes a regulating term and a projection term, wherein optimizing the layer loss function includes applying an iterated approximation algorithm to obtain the projection layer output vector.

11. An autonomous device controller having a neural network device for applying a trained neural network, the neural network including a sequence of neural network layers, wherein input data of the neural network device is applied to sensor data of an autonomous device, the neural network being configured to classify objects in the sensor data, an autonomous device control being configured for decision making depending on the classification, the neural network device is configured for applying the trained neural network, the neural network device comprising:

a communication interface for receiving the input data;

a non-transitory neural network storage configured to store trained parameters for multiple layers of the sequence of neural network layers; and a processor system configured to apply the sequence of neural network layers to the input data, wherein at least one layer of the sequence of neural network layers, both during training and in the trained neural network, is a projection layer, the projection layer being configured for a summing parameter, the summing parameter being at least 2, and is configured to project a layer input vector of the projection layer to a projection layer output vector in a limited multi label (LML) polytope which is a set of points in a unit hypercube with coordinates that sum to the summing parameter, the projecting including optimizing a layer loss-function applied to the projection layer output vector subject to the condition that the projection layer output vector sums to the summing parameter, wherein the layer loss-function includes a regulating term and a projection term, wherein optimizing the layer loss function includes applying an iterated approximation algorithm to obtain the projection layer output vector.

12. A neural network training method for training a neural network, the neural network including a sequence of neural network layers, the method for classifying objects comprising:

accessing training data comprising object classifications;

storing parameters for multiple layers of the sequence of neural network layers; and apply the sequence of neural network layers to data of the training data, and adjust the stored parameters to train the network, wherein at least one layer of the sequence of neural network layers, both during training and in the trained neural network, is a projection layer, the projection layer being configured for a summing parameter applying the projection layer including projecting a layer input vector of the projection layer to a projection layer output vector in a limited multi label (LML) polytope which is a set of points in a unit hypercube with coordinates that sum to the summing parameter, the summing parameter being at least 2, the projecting including optimizing a layer loss-function applied to the projection layer output vector subject to the condition that the projection layer output vector sums to the summing parameter, wherein the layer loss-function includes a regulating term and a projection term, wherein optimizing the layer loss function includes applying an iterated approximation algorithm to obtain the projection layer output vector.

13. A neural network method for applying a trained neural network, the neural network including a sequence of neural network layers, the method comprising:

receiving input data;

storing trained parameters for multiple layers of the sequence of neural network layers; and applying the sequence of neural network layers to the input data, wherein at least one layer of the sequence of neural network layers, both during training and in the trained neural network, is a projection layer, the projection layer being configured for a summing parameter, applying the projection layer includes projecting a layer input vector of the projection layer to a projection layer output vector in a limited multi label (LML) polytope which is a set of points in a unit hypercube with coordinates that sum to the summing parameter, the summing parameter being at least 2, the projecting including optimizing a layer loss-function applied to the projection layer output vector subject to the condition that the projection layer output vector sums to the summing parameter, wherein the layer loss-function includes a regulating term and a projection term, wherein optimizing the layer loss function includes applying an iterated approximation algorithm to obtain the projection layer output vector.

14. A non-transitory computer readable medium having data representing instructions, which when executed by a processor system, cause the processor system to perform a neural network training method for training a neural network, the neural network including a sequence of neural network layers, the method comprising:

accessing training data;

storing parameters for multiple layers of the sequence of neural network layers; and apply the sequence of neural network layers to data of the training data, and adjust the stored parameters to train the network, wherein at least one layer of the sequence of neural network layers, both during training and in the trained neural network, is a projection layer, the projection layer being configured for a summing parameter applying the projection layer including projecting a layer input vector of the projection layer to a projection layer output vector in a limited multi label (LML) polytope which is a set of points in a unit hypercube with coordinates that sum to the summing parameter, the summing parameter being at least 2, the projecting including optimizing a layer loss-function applied to the projection layer output vector subject to the condition that the projection layer output vector sums to the summing parameter, wherein the layer loss-function includes a regulating term and a projection term, wherein optimizing the layer loss function includes applying an iterated approximation algorithm to obtain the projection layer output vector.

15. The training device according to claim 1, wherein the function in the regulating term includes minus a binary entropy function, and/or the projection term includes minus the dot-product of the layer input vector and the projection layer output vector.

16. The training device according to claim 1, wherein optimizing the layer loss-function is a bisection method.

17. A non-transitory computer readable medium having data representing instructions, which when executed by a processor system, cause the processor system to perform a neural network method for applying a trained neural network, the neural network including a sequence of neural network layers, the method comprising:

receiving input data;

storing trained parameters for multiple layers of the sequence of neural network layers; and applying the sequence of neural network layers to the input data, wherein at least one layer of the sequence of neural network layers, both during training and in the trained neural network, is a projection layer, the projection layer being configured for a summing parameter, applying the projection layer includes projecting a layer input vector of the projection layer to a projection layer output vector in a limited multi label (LML) polytope which is a set of points in a unit hypercube with coordinates that sum to the summing parameter, the summing parameter being at least 2, the projecting including optimizing a layer loss-function applied to the projection layer output vector subject to the condition that the projection layer output vector sums to the summing parameter, wherein the layer loss-function includes a regulating term and a projection term, wherein optimizing the layer loss function includes applying an iterated approximation algorithm to obtain the projection layer output vector.

* * * * *